Sept. 16, 1958 | H. I. REISKIND | 2,852,254

MAGNETIC RECORDER

Filed Dec. 16, 1954 | 2 Sheets-Sheet 1

INVENTOR.
HILLEL I. REISKIND

BY Morris A. Rabkin

ATTORNEY

Sept. 16, 1958 H. I. REISKIND 2,852,254

MAGNETIC RECORDER

Filed Dec. 16, 1954 2 Sheets-Sheet 2

INVENTOR.
HILLEL I. REISKIND
BY [signature]
ATTORNEY

United States Patent Office 2,852,254
Patented Sept. 16, 1958

2,852,254

MAGNETIC RECORDER

Hillel I. Reiskind, Indianapolis, Ind., assignor to Radio Corporation of America, a corporation of Delaware Application December 16, 1954, Serial No. 475,661

11 Claims. (Cl. 271—2.18)

This invention relates to the art of magnetic recording, and more particularly to novel means which provides a magazine or cartridge for an endless loop magnetic record member.

Magnetic record members in the form of endless loops have been provided which included a spiralled main body portion and a cross-over loop portion. The cross-over loop portion connects the inner end of the spiral to the outer end, making the loop endless. Such a record member, however, has the disadvantage of being difficult to handle. When such a loop is handled by anyone who is either inexperinced or careless, the result is usually an unusable tangle of tape. Alternatively, complicated and expensive magazines have been proposed which are complex in construction and operation.

Accordingly, it is an object of the present invention to provide an improved tape reeling system for an endless loop of record tape.

It is another object of this invention to provide an improved reeling system as set forth wherein the endless loop record member is permanently supported on a simple mounting board.

It is a further object of this invention to provide an improved reeling system as set forth wherein the tape is carried in a simple magazine.

It is yet another object of this invention to provide, in an improved reeling system as set forth, an improved endless loop tape magazine which is characterized by simplicity of structure and operation.

In accomplishing these and other objects, there has been provided, in accordance with the present invention, a tape recording mechanism in which a magnetic record tape in the form of an endless loop, including a spiral wound body portion and a cross-over portion, is held onto a flat mounting member by a series of brackets. There is also provided a somewhat similar structure in which a cover member is provided for the mounting member, to form a magazine in which the tape is enclosed.

A better understanding of this invention may be had from the following detailed description when read in connection with the accompanying drawing, in which.

Figures 1, 2, 3, 4:
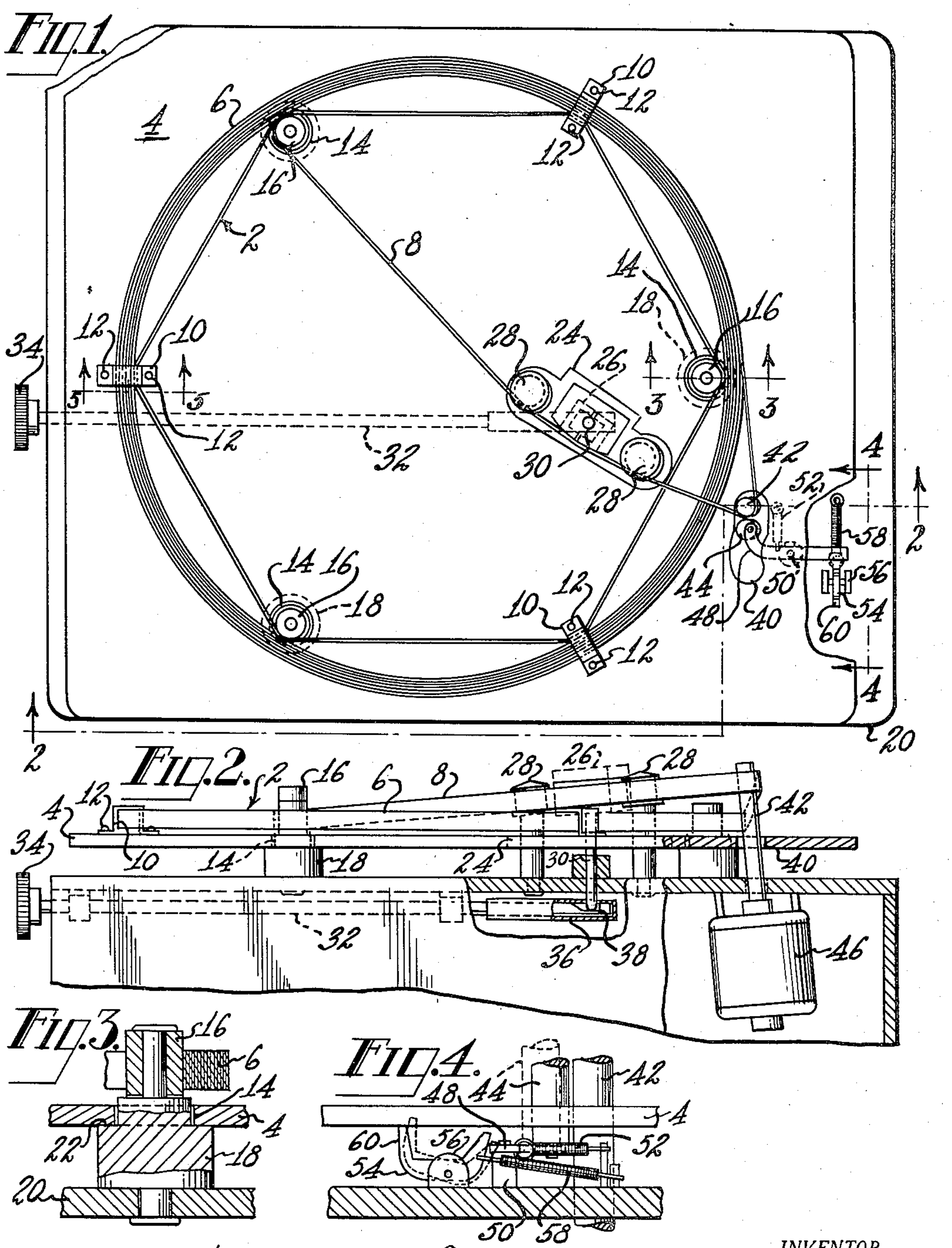
Fig. 1 is a top plan view, partly broken away, showing a reeling system embodying the present invention.
Fig. 2 is a sectional view taken along the line 2—2 of Fig. 1 looking in the direction of the arrows.
Fig. 3 is a sectional view taken along the line 3—3 of Fig. 1 looking in the direction of the arrows.
Fig. 4 is a view, partly in section, taken along the line 4—4 of Fig. 1.
Figure 5:
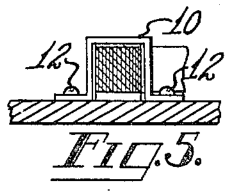
Fig. 5 is a view, partly in section, taken along the line 5—5 of Fig. 1 as viewed in the direction of the arrows and showing a tape holding bracket.
Figure 6:
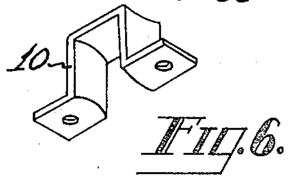
Fig. 6 is a perspective view of a bracket of the type shown in Fig. 5.
Figures 7, 8:
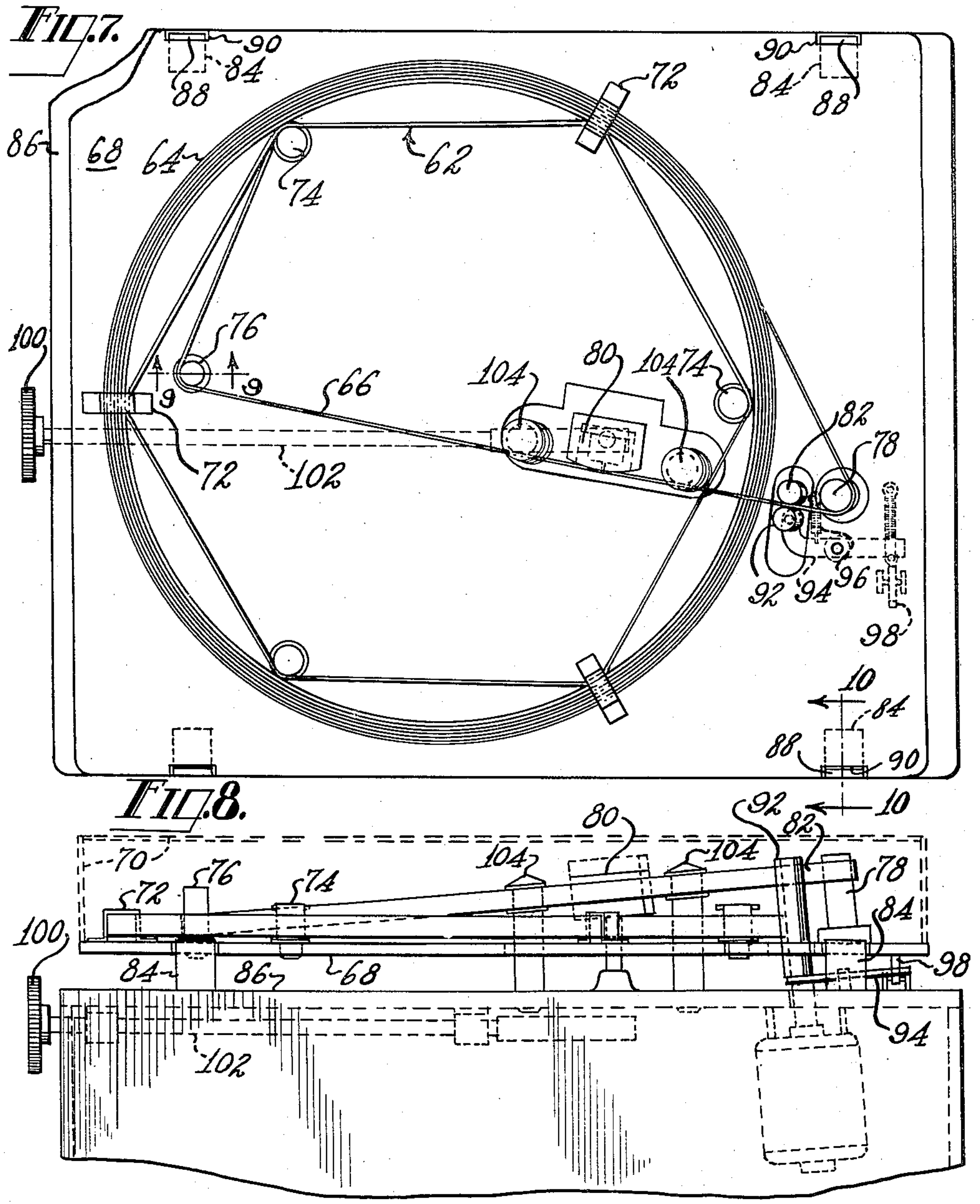
Fig. 7 is a top plan view of a somewhat different structure also embodying the present invention.
Fig. 8 is a front elevational view, partly in phantom, of the structure shown in Fig. 7.
Figure 9:
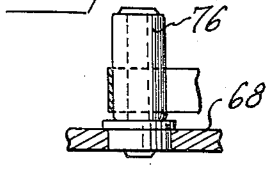
Fig. 9 is a sectional view taken along the line 9—9 of Fig. 7 as viewed in the direction of the arrows.
Figure 10:
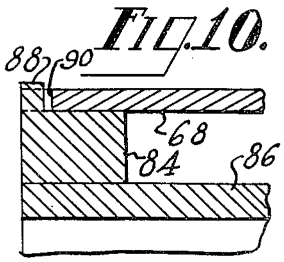
Fig. 10 is a sectional view taken along the line 10—10 of Fig. 7 and viewed in the direction of the arrows.

Referring now to the drawing in more detail, there is shown in Figs. 1 and 2 a magnetic recording system designed for use with an endless loop magnetic record member. An endless loop of magnetic record tape 2 is mounted on a carrier member 4. The tape is supported in such a manner that the main body portion comprises a flat spiral 6. The inner extremity of the spiral 6 is connected to the outer winding by a cross-over loop 8. The tape 2 is held on the carrier member 4 by means of a series of brackets 10. These brackets 10 may be of the type shown in more detail in Figs. 5 and 6. As illustrated, each of these brackets 10 may be a U-shaped strip of metal which is secured to the carrier member 4 by means of rivets, screws or the like 12.

The carrier member 4, itself, may be made in the form of a relatively flat sheet of any suitable material which has sufficient rigidity to support the coil of tape 2 in operative relation to the playing apparatus. It may be constituted, for example, of such material as pressed paper board, machined or cast metal, or machined or molded plastic. The carrier member 4 is provided with suitable openings 14 through which idler rollers 16 may extend. The idler rollers 16 may be substantially of the construction shown in Fig. 3 wherein a stud member 18 is mounted on the upper surface of a mounting board 20 of the record playing apparatus. The stud 18 is provided with a shoulder 22 which supports the carrier member 4 in spaced relation to the mounting board 20. The portion of the stud 18 which extends through the opening 14 cooperates with the edges of that opening to index the carrier member 4 in proper playing position with respect to the record playing apparatus. In the illustrative embodiment shown in Figs. 1 and 2, there are three such studs. The idlers 16 extend above the studs and are positioned to engage the inner surface of the spiralled body portion 6 of the tape.

The carrier member 4 is provided with another opening 24. This opening 24 is positioned to permit the passage therethrough of a magnetic recording transducer 26 and means 28 for guiding the tape 2 into proper position with respect to the transducer 26.

In order that the apparatus may be used in such a manner that two adjacent record tracks on the tape 2 may be handled by the apparatus, the magnetic recording transducer is of a width to engage no more than half the width of the record tape 2. Means are provided for selectively positioning the transducer 26 to engage a portion of the tape 2 above or below a longitudinal median line. Thus, two adjacent and parallel record tracks may be placed on a single record member. The means for effecting the selective positioning of the transducer 26 may be substantially as illustrated wherein the transducer 26 is mounted on the upper end of a transducer carrying rod 30 which extends through the mounting board 20 and engages a selector shaft 32. The shaft 32 may be rotated by means of a knob 34 to present a circumferential face 36 or a notched face to the lower end of the transducer carrying rod 30. When the circumferential face 36 is presented to the rod 30, the transducer is positioned to engage the uppermost of two tracks on the tape 2. Alternatively, with the notched face presented to the rod 30, the transducer is positioned to engage the lowermost of the two adjacent tracks.

A third opening 40 in the carrier member 4 permits the passage of a capstan 42 and a pressure roller 44 therethrough. Suitable means are provided for driving a capstan 42 at a constant velocity. Such means are represented in the drawing by a motor 46 the shaft of which is directly connected to the capstan 42. Although the direct connection is illustrated, it will, of course, be appreciated that a suitable reduction coupling may be provided without departing from the spirit and scope of the present invention. The pressure roller 44 is mounted on a pivot arm 48. The pivot arm 48 is pivotally carried on a stud 50 and is biased by a spring 52 to bring the pressure roller 44 into engagement with the capstan 42. In order that the tape may be readily fed through the space between the capstan 42 and the pressure roller 44, means are provided for separating the pressure roller from the capstan whenever the carrier member is not in place on the machine. This means includes a rocker member 54 (shown more clearly in Fig. 4) which is carried in a yoke 56 so that it may have a rocking movement. The rocker member 54 is biased toward an extreme position (shown dotted in Fig. 4) by a spring 58 whenever the carrier member 4 is not in place. When the rocker member is thus biased, one leg of the rocker engages the free end of the pivot arm 48 causing the pivot arm to be moved about its stud 50, thereby separating the pressure roller 44 from the capstan 42. However, when the carrier member 4 is properly placed on the machine, the opposite leg 60 of the rocker member 54 engages the underside of the carrier member 4. Positioning the carrier member 4 in this manner on the machine causes the roller member 4 to be disengaged from the pivot arm 48. This allows the pressure roller 44 to reengage the capstan under the influence of the spring 52.

In the illustrated embodiment, it will be noted that the capstan 42, the pressure roller 44, the transducer assembly 26 and the tape guides 28 adjacent the transducer are canted to accommodate the slope of the cross-over loop 8. Similarly, in the illustrative embodiment, there are shown three of the U-shaped brackets 10 holding the tape 2 onto the carrier member 4. It will be appreciated that more of these brackets could be used without departing from the spirit and scope of the present invention. Again, there are three of the idlers 16 shown. Here too, the number of idlers may be increased as desired.

When the carrier member 4 is removed from the machine, the tape 2 is held thereon solely by the brackets 10. Such an arrangement conveniently holds the coil of tape in readiness for use on an appropriate machine while preventing, to a large extent, tangling of the loop of tape. It will be readily appreciated that an arrangement such as has heretofore been described wherein the endless loop of tape is held by such brackets on a carrier member 4 provides a convenient and inexpensive magazine or cartridge structure. While the brackets 10 have been shown or described as being substantially U-shaped sheet metal members, they may include, of course, a roller member replacing one of the legs of the U-shaped member.

Referring now to Figs. 7 through 10, a somewhate different structure is illustrated which also embodies the present invention. Here a closed loop of tape 62 includes a spirally wound main body portion 64 and a cross-over loop 66 mounted on a carrier member 68. In this instance, however, the carrier member is provided with a cover 70 which substantially entirely encloses the tape member 62. Whereas, in the previously described embodiment, the tape was accessible for hand feeding into operative relationship with the several elements of the machine, in the present embodiment, the tape must be automatically engageable by the operating elements of the recording apparatus. Thus the closed loop of the tape 62 is held on the carrier member 68 by a plurality of brackets 72 which may be substantially the same as those described with respect to the apparatus shown in Fig. 1. These brackets also may include a roller member constituting the inner leg member of the U-shaped bracket against which the inner surface of the spiralled body portion of the tape is carried. Idler rollers 74, somewhat similar to the idlers 16 previously described, are also positioned about the inner surface of the spiralled body portion to guide the loop of tape in its path of movement. Instead of the idlers 74 being mounted on the mounting board of the machine as they were in the previously described embodiment, they are mounted permanently on the carrier member 68. This arrangement is necessary since the loop of tape is not accessible for hand feeding. It will, of course, be apparent that the bracket 72 may be replaced by idler rollers similar to the idlers 74. Suitable flanges on the idlers prevent the tape from inadvertently being removed therefrom.

An additional idler 76 is positioned to carry the end of the inner turn of the spiralled body portion as it leaves the spiral and becomes the cross-over loop. A further idler 78 is positioned to support the opposite end of the cross-over loop externally of the spiralled body portion of the tape. These two idlers 76 and 78 are positioned with respect to the carrier member 68 in such a manner that the reach of tape extending between them will fall into operative position with respect to a transducer 80 and a capstan 82 whenever the carrier member is positioned on the recording apparatus.

To assure proper positioning of the carrier member with respect to the recording apparatus, a plurality of support shoulder members 84 are provided on the mounting board 86 of the recording apparatus. Each of these shoulder members 84 has an upstanding lip 88 which engages a corresponding recess 90 in the carrier member. This arrangement is most clearly shown in Fig. 10.

As in the previous example, a pressure roller 92 is positioned adjacent the capstan for cooperation with the capstan in driving the tape in its path of movement. Here again, the pressure roller is mounted on a pivot arm 94 which is normally biased into engagement with the capstan by a spring 96. To make the pressure roller and capstan automatically engageable and disengageable with respect to each other upon the insertion or removal of the carrier member 68, a rocker member 98, similar to the rocker 54 illustrated in Fig. 4, is provided. This operates in the same manner as the rocker 54 to effect engagement or disengagement of the pressure roller with respect to the capstan.

Here too, there is provided means including a knob 100 and shaft 102 for effecting the movement of the transducer 80 into engagement with one or the other of two parallel record tracks. With the arrangement thus described, it will be apparent that if the carrier member is placed on the machine so that the upper edge of the carrier member, in the illustrative embodiment, rests upon the shoulder 84 and is then slid gently in an upward direction until the carrier member is seated on the four illustrated shoulders, the cross-over loop of the tape held between the idlers 76 and 78 will fall into engagement with the transducer 80 and its associated guide members 104 and the capstan 82. The seating of the carrier member on the shoulders allows the pressure roller 92 to move into engagement with the capstan.

Thus, it may be seen that there has been provided an improved tape reeling system for endless loop record tapes wherein the record member is permanently supported on a simple mounting board or in a simple container either of which constitutes a magazine for the tape and is characterized, in addition to simplicity, by economy of both structure and operation.

What is claimed is:

1. An endless loop magnetic record magazine comprising a tape carrier member in the form of a flat sheet member, an endless loop of tape in the form of a spirally wound body portion and a cross-over loop portion connecting the inner turn of said spirally wound body portion to the outer turn of said spirally wound body portion, means cooperating with said tape in said cross-over loop portion for establishing a tape feed path between said inner turn and said outer turn over said carrier member, said carrier member having an aperture thereon along said path for receiving a magnetic transducer for scanning said tape, and bracket means secured to said carrier member whereby to carry said tape in coiled condition on said carrier member.

2. An endless loop magnetic record magazine comprising a tape carrier member in the form of a flat sheet member, an endless loop of magnetic record tape in the form of a spirally wound body portion and a cross-over loop portion connecting the inner turn of said spirally wound body portion to the outer turn thereof, at least one tape guide roller for engaging said tape in said cross-over loop portion for establishing a tape feed path between said inner and outer turns over said carrier member, said carrier member having two apertures therein spaced from each other along said path for receiving cooperating tape dividing means disposed on opposite sides of said path through one of said apertures and a magnetic transducer for scanning said tape through the other of said apertures, and bracket means secured to said carrier member whereby to carry said tape in coiled condition on said carrier member.

3. An endless loop magnetic tape record magazine comprising a tape carrier member in the form of a flat sheet member, an endless loop of tape in the form of a spirally wound body portion and a cross-over loop portion connecting the inner turn of said spirally wound body portion to the outer turn thereof, bracket means secured to said carrier member whereby to carry said tape in coiled condition on said carrier member, means for establishing a tape feed path between said outer turn and said inner turn having a substantially straight run, including a pair of tape guide rollers mounted on said carrier member and spaced from each other, said carrier member having a pair of apertures therein spaced from each other along said path between said rollers, one of said apertures being adapted to receive a magnetic transducer for scanning said tape and the other of said apertures being adapted to receive tape engaging and driving means, and cover means cooperatively associated with said carrier member to enclose said carried tape.

4. An endless loop magnetic tape record magazine comprising a tape carrier member in the form of a flat sheet member, an endless loop of tape in the form of a spirally wound body portion and a cross-over loop portion connecting the inner turn of said spirally wound body portion of the outer turn thereof, bracket means secured to said carrier member whereby to carry said tape in coiled condition on said carrier member, said carrier member having openings therein whereby to permit the passage of tape driving and transducing means therethrough into operative engagement with said tape, cover means cooperatively associated with said carrier member to enclose said carrier tape, and guide roller means mounted on said carrier member within the enclosure defined by said cover means, said guide roller means being positioned to define a path of movement for said tape between said inner and outer turns.

5. The invention as set forth in claim 4 wherein said guide roller means includes a pair of guide rollers between which said cross-over loop extends in position to be engaged by said tape driving and transducing means.

6. A magazine for containing a record member and for cooperation with apparatus for transporting record members including a support member having a record transducer and drive means for said record member mounted thereon in spaced relationship to each other, said magazine comprising a member for carrying a coil of said record member, means for guiding said record member from one end of said coil defining a path on said carrier member along which said record member is transported, and said carrier member having two openings therein along said path in spaced relationship to each other corresponding to said relationship between said drive means and said transducer, said carrier member being positionable upon said support structure with said transducer and said drive means extending through said openings for cooperative engagement with said record member.

7. A magazine for containing an elongated tape record member and for cooperation with apparatus for handling said tape adapted to reproduce signals recorded thereon, said apparatus including a mounting plate having a transducer for scanning said tape and a roller for driving said tape thereon, said magazine comprising a plate for carrying a coil of said tape, two guide rollers on said plate spaced from each other for establishing therebetween a substantially straight path, along which said tape is transportable, and said carrier plate having a pair of openings therein spaced along said path for receiving said transducer and said drive roller in cooperative relationship with said tape when said carrier plate is positioned on said mounting plate.

8. A magazine for an elongated tape record member and for cooperating with apparatus having a tape drive roller and a record transducer spaced from each other along a predetermined path, said magazine comprising a plate for carrying a coil of said tape, a guide roller on said plate defining one terminus of a path of tape travel over said plate from one end of said coil, said plate having a plurality of openings therein for receiving said transducer and said drive roller when said plate is positioned on said apparatus whereby to guide said path of tape travel on said plate along said predetermined path.

9. In equipment for handling magnetic tape records disposed on a tape carrying structure including a capstan for feeding a tape record, a magnetic transducer spaced from said capstan along the path of feed of said tape record and a pressure roller disposed on the opposite side of said path from said capstan, said pressure roller and capstan being movable toward each other for engaging and feeding said tape, means for normally biasing said pressure roller and capstan out of engagement with each other to permit said record tape to be positioned therebetween, and means disposed for cooperation with said carrier for said record tape for counteracting said bias to permit engagement of said capstan and pressure roller with said record tape.

10. In equipment for handling tape records disposed on a tape carrier device positionable upon a mounting surface of said equipment, said equipment including a rotatable member for feeding said tape, a transducer for scanning said tape spaced along the path of feed of said tape from said rotatable member disposed on the opposite side of said path from said transducer, said rotatable members being a capstan and a pressure roller, said members being movable with respect to each other for engagement with said tape to feed said tape along said path, a movable member carrying one of said rotatable members, spring means connected to said movable member for biasing said rotatable members for engagement with each other, a pivotable member contacting said movable member when tilted in a first direction for moving said rotatable member against said bias out of engagement with said other rotatable member, and said pivotable member having an end disposed for engagement with said tape carrier device for tilting said pivotable member in an opposite direction when said device is positioned on said equipment for causing said rotatable members to engage each other.

11. Equipment for handling elongated record mediums including a capstan for feeding a record medium and a transducer spaced from said capstan along the path of feed of said medium, said equipment being adapted to cooperate with a device for carrying said record medium having a plate for supporting said medium for travel along a path thereon corresponding to said feed path in said equipment, said plate having a pair of openings therein spaced along said path for receiving said capstan and said transducer when said device is positioned on said equipment, said plate having a notch therein along an edge thereof, said notch being disposed in spaced relationship to said openings, and a post on said equipment disposed in spaced relationship with said transducer and said capstan for positioning said device on said equipment.

References Cited in the file of this patent

UNITED STATES PATENTS

| | | |
|---|---|---|
| 2,167,817 | Smith | Aug. 1, 1939 |
| 2,203,032 | Spence | June 4, 1940 |
| 2,327,108 | Heyer | Aug. 17, 1943 |
| 2,349,122 | Streeter | May 16, 1944 |
| 2,363,403 | De Napoli | Nov. 21, 1944 |
| 2,656,184 | Eddy | Oct. 20, 1953 |
| 2,701,718 | Allen et al. | Feb. 8, 1955 |